United States Patent [19]

Modrak

[11] Patent Number: 5,441,812
[45] Date of Patent: Aug. 15, 1995

[54] OLEOPHILIC STAPLE FIBERS USEFUL IN PAVEMENT FOR MAKING AND REPAIRING GEOWAYS

[75] Inventor: James P. Modrak, Conyers, Ga.

[73] Assignee: Hercules Incorporated, Wilmington, Del.

[21] Appl. No.: 285,556

[22] Filed: Aug. 3, 1994

[51] Int. Cl.⁶ .............................................. D07G 3/00
[52] U.S. Cl. .................... 428/359; 428/375; 428/395; 252/8.6
[58] Field of Search ............... 525/177; 428/359, 375, 428/395; 252/8.6, 8.75, 8.8, 8.9

[56] References Cited

U.S. PATENT DOCUMENTS

| | | | |
|---|---|---|---|
| 3,925,589 | 12/1975 | Sturwold et al. | 428/395 |
| 3,959,187 | 5/1976 | Kardol et al. | 252/565 |
| 3,959,560 | 5/1976 | Sturwold et al. | 428/394 |
| 4,938,832 | 7/1990 | Schmalz | 156/308.8 |

FOREIGN PATENT DOCUMENTS

| | | |
|---|---|---|
| 0486158 | 5/1992 | European Pat. Off. |
| 0516412 | 12/1992 | European Pat. Off. |
| 0557024 | 8/1993 | European Pat. Off. |

*Primary Examiner*—N. Edwards
*Attorney, Agent, or Firm*—Mark D. Kuller; Bradley N. Ruben

[57] ABSTRACT

The invention provides polyolefin staple fibers especially useful for reinforcing pavement. The fibers have applied to their surface an amount of an antistatic finish sufficient to prevent the build-up of static electric charges when the staple fibers are fluidized or blown, and so diminish the resultant clumping of the blown fibers, while avoiding degradation of the nature of the fiber to adhere to paving compositions, and maintaining the adherence of the fibers to the pavement cement.

11 Claims, No Drawings

OLEOPHILIC STAPLE FIBERS USEFUL IN PAVEMENT FOR MAKING AND REPAIRING GEOWAYS

BACKGROUND OF THE INVENTION

1. The Field of the Invention

The present invention pertains to polyolefin staple fibers treated to render them suitable for fluidizing and conveying by air ("airveying") without the generation of static charge and which are sufficiently oleophilic to be useful for reinforcing pavement. The invention also relates to the use of such staple fibers in pavement and geoways, and to methods for making pavement and geoways using the staple fibers.

2. The State of the Art

In the paving and repairing of synthetic load-bearing vehicular geoways, such as roadways, aircraft and aeronautic takeoff/landing runways and launch pads, and similar surfaces, an asphalt cement (i.e., pure asphalt) is typically used as a base material. Asphalt cement is comprised of asphalt and/or bitumen combined with flux oil (i.e., oil obtained from asphalt-base petroleum, typically 20°-25° Bë). The asphalt cement is typically mixed with coarse graded mineral aggregate, such as broken stone, slag, or gravel mixed with sand, to produce an asphalt concrete used as the commonly recognized roadway surface. Asphalt-type cement compositions typically contain asphalt cement, rubber, or mixtures of asphalt cement with rubber and/or acrylic copolymers, and asphalt-type concrete compositions contain an asphalt-type cement and aggregate materials. The superambient softening temperature of the asphalt cement in the asphalt concrete requires that the concrete be processed to an elevated temperature to allow its flowable application to the surface being paved or repaired.

Polymeric fibers have been used, among other applications, for the reinforcement of engineering compositions having a variety of utilities. Asphalt-type pavements frequently contain synthetic polymeric staple fibers to improve flexibility and durability of the pavement. For instance, Duszak et al., in U.S. Pat. No. 4,492,781 (the disclosure of which is incorporated herein by reference), describe a fiber-reinforced asphalt-type pavement comprising an emulsifying agent, a water-soluble polymer, and 0.25% to 10% of reinforcing fibers, such as polyethylene or polypropylene staple fiber about 0.1 to 20 mm long, as well as conventional aggregate and thickening and curing agents, for application to surfaces as a hot mixture or as an emulsion. Either hot mix or emulsified asphalt-type compositions may be applied as a filler for underlying cracks in the surface as a waterproof layer between old and new pavements, or as an external surfacing material. These different uses as filler and as new pavement involve differences in the amount and fineness of aggregate, the concentration and length of the reinforcing fibers, and the use of different and various conventional additives.

Synthetic staple fibers such as polypropylene and polyethylene fibers are desirable because they are compatible with asphalt-type pavements. The longer lengths and higher concentrations of reinforcing fibers that facilitate interconnections between the fiber and the asphalt matrix, and an increase in durability, nevertheless adversely effect the pumpability (flowability) of the pavement and tend to produce clumping of the fibers. The addition of reinforcing fibers also requires a higher processing temperature range than the conventional 140°-150° C. (284°-302° F.) range for convenient hot application.

Fry, in U.S. Pat. No. 4,422,878 (the disclosure of which is incorporated herein by reference), describes asphalt-type pavements containing about 4-10 wt. % of a fibrous filler, about 2.5 to 15 wt. % of a mixture of eighteen-carbon fatty acids, and up to about 30 wt. % rosin.

Leibee et al., in U.S. Pat. No. 4,662,759, and Trimble, in U.S. Pat. No. 4,502,814 (the disclosures of which are incorporated herein by reference), respectively disclose devices useful for admixing reinforcing fibers into an asphalt-type pavement and for the continuous deposition of a fiber- and asphalt-containing pavement.

Modrak, in European Patent Appln. No. 494,326 (the disclosure of which is incorporated herein by reference), describes fiber-reinforced asphalt pavements characterized in that the reinforcing fibers are bicomponent fibers comprising a polyolefin-containing bonding component conjugated with a polyolefin-wettable reinforcing component.

As part of the conventional processing of many fibers, an antistatic composition is typically applied to the fiber after spinning. After the fiber is spun it is routed at high speed to various physical and chemical treatments by the use of guides, rollers, and other conveying hardware. To ameliorate friction between the fiber and the conveying hardware, the art typically applies a lubricating finish to the fiber after spinning (a spin finish). Even with use of a lubricant, contact between the moving fiber and the stationary hardware can generate static electricity. Accordingly, the art may also apply an antistatic composition to the fiber. Antistatic compositions typically function by at least one of three methods: improving the surface conductivity to allow the electrons to move to ground or the atmosphere; attracting molecules of water to the surface, again improving the surface conductivity; and developing an electric charge opposite that of the fiber, which neutralizes the electrostatic charges.

Examples of fibers having an antistatic composition are described by Schmalz in U.S. Pat. No. 4,938,832 and EP 0 486 158 A2 (corresponding to U.S. pat. appln. Ser. No. 914,213, filed Jul. 15, 1992) (the disclosures of which are all incorporated herein by reference), in which the spun fiber is treated with a blend of compositions comprising at least one amine or alkali metal neutralized phosphoric acid alkyl ester (an antistatic component) and a siloxane lubricant.

Harrington, in EP 0 557 024 A1 (the disclosure of which is incorporated herein by reference), describes a polyolefin fiber having an antistatic finish comprising at least one neutralized $C_3$–$C_{12}$ alkyl or alkenyl phosphate alkali metal or alkali earth metal salt and a solubilizer, or a neutralized phosphoric ester salt having the general formula $(MO)_x$—$(PO)$—$(O(R_1)_nR)_y$ wherein generally M is an alkali or alkali earth metal, $R_1$ is a short chain alkylene oxide, R is a long chain alkyl or alkenyl group, and x and y are natural numbers having the sum of 3. The solubilizer can be selected from among glycols, polyglycols, glycol ethers, and the aforementioned neutralized phosphoric ester salts.

Johnson and Theyson, in U.S. patent application Ser. No. 08/115,374, filed Sep. 2, 1993, and in European Patent Appln. No. 0 516 412 (the disclosures of which are incorporated herein by reference), describe a finish comprising a polyol or a derivative thereof formed by reacting the polyol with a fatty acid or a short chain alkylene oxide, and an antistatic finish comprising an amine or alkali metal neutralized phosphoric acid ester of the general formula $(MO)_x—(PO)—(OR)_y$ wherein M is an amine or alkali metal, R is an alkyl group, and x and y are natural numbers having the sum of 3. The fibers may also have an overfinish comprising a polysiloxane (lubricant) and the antistatic finish just mentioned.

One drawback to using an antistatic finish on a fiber used for reinforcing pavement is that the use of relatively high amount of such finishes renders the fiber less oleophilic, and thus less compatible with the asphalt cement (and similar materials) in the pavement.

SUMMARY OF THE INVENTION

It is important that the reinforcing staple fibers be well-dispersed in the pavement. The staple fibers are made from tows having on the order of 300 filaments (or more or less) that are chopped into staple fibers; the cut staple fibers typically stay together as little bundlettes, and are provided in this form for admixing in pavements. One means for dispersing the staple fibers in the pavement is to fluidize them in a gaseous stream (typically air) and mix them with the viscous asphaltic composition in a injection system (such as disclosed by Leibee et al. or Trimble, mentioned above).

It is an unappreciated problem that fluidizing and conveying the staple fibers (termed herein "airveying", akin to 'air conveying'), although accomplishing its intended result of breaking up the bundlettes and dispersing the fibers in the gaseous stream, may nevertheless cause a sufficient static electric charge to build up on the now dispersed staple fibers that they form clumps due to their static charges. Thus, while at first glance it may seem that the staple fibers admixed into the resulting pavement were clumped due to insufficient break-up of the bundlettes, it has now been discovered that the generation of static electricity is detrimental to dispersing the staple fibers into the pavement. It has also been discovered that there is an operating region wherein an antistatic composition can be applied in an amount sufficient to negate the static electric charges generated during airveying and without degrading the staple fibers' compatibility with the pavement.

Accordingly, one object of this invention is to provide novel staple fibers, and the precursor products necessary for making such staple fibers, that can be processed by airveying without generating sufficient static charge to clump. Another object of this invention is to provide a pavement reinforced by these novel fibers, and to produce geoways and to repair geoways using such a pavement.

In summary, the present invention provides a polyolefin staple fiber suitable for reinforcing pavements wherein the fiber has on its surface an antistatic finish in an amount effective to prevent clumping when a multiplicity of the staple fibers are airveyed, wherein the fiber with the finish on its surface is oleophilic. Typically, the effective amount will be that which provides a blower static charge of not more than about 1.0 kV. Preferred antistatic finishes include neutralized phosphoric acid esters.

This invention also provides a method for making a pavement using reinforcing polyolefin staple fibers having on their surface an antistatic finish in an amount effective to prevent clumping when the fibers are airveyed and wherein the fibers with the finish on their surface are oleophilic, which method includes providing a pavement mixing device, providing such staple fibers, conducting a flowable pavement to the mixing device, airveying the fibers to the mixing device, and mixing the airveyed fibers and the pavement in the mixing device to provide a fiber-reinforced pavement.

This invention also provides a method for making and repairing geoways by making the fiber-reinforced pavement as just mentioned, providing a surface suitable for paving or in need of repair, and applying the fiber-reinforced pavement to the surface to make or repair the geoway.

DETAILED DESCRIPTION OF SPECIFIC EMBODIMENTS

As used herein, "geoway" is a synthetic surface designed to support land or air vehicles, and includes such surfaces as roadways, runways, launch pads, heliports, and their associated support surfaces (e.g., taxiways, hanger bay floors, etc.). It might be noted that each of these geoways has a different design criteria; for example, launch pads must withstand extreme temperatures, and runways generally bear greater loads than roadways.

As used herein, "pavement" is given its common meaning of either a paved surface that is artificially covered (i.e., a geoway) or the composition with which a geoway is paved, as the context warrants. As regards the composition used for paving, "pavement" includes the base materials mentioned above which are suitable for pavement, such as asphalt cement, rubber, or mixtures of asphalt cement with rubber and/or acrylic copolymers, and like compositions, as well as a concrete having aggregate materials (as the context warrants).

As used herein, "oleophilic" and related terms indicate an attraction or adhesion to oily substances, and including an attraction to fatty substances (lipophilic), and especially "asphaltaphilic", i.e., attraction to a cement (typically asphalt) used in pavement.

As used herein with reference to staple fibers the verb "airvey" is meant to be at least fluidization of a multiplicity of the staple fibers in a gaseous medium (typically air) and optionally conveying the staple fibers in fluidized form to a different location. As the invention is generally related to dispersing stable fibers in a pavement and to the now discovered problem of static-induced clumping of gas-fluidized fibers, "airvey" includes gas-fluidizing staple fibers and admixing the fluidized staple fibers with a matrix or cementitious material.

The invention is generally concerned with preventing static charges on reinforcing staple fibers which have been fluidized and conveyed by a gaseous medium. Staple fibers of reinforcing lengths, preferably on the order of 5–25 mm long, are preferably used in combination with airveying for manufacturing pavement.

The staple fibers are polyolefins in that they contain at least 50% (all percentages are weight basis unless otherwise noted) of a polyolefin. Preferred polyolefins are homopolymers having units derived from $C_2$–$C_6$ olefinic monomers, preferably from $C_2$–$C_4$ olefinic monomers, and especially ethylene and propylene monomers. Also preferred are copolymers of a $C_2$–$C_4$ olefinic monomers with at least one other different $C_2$–$C_6$ olefinic monomer (e.g., 4-methylpentene-1), and preferably with another $C_2$–$C_4$ monomer such as ethylene, propylene, 1-butene, 2-butene, 1,3-butadiene, and the like, and with mixtures thereof. Any polyolefin having the physical and chemical characteristics necessary to be made into staple fibers and used to reinforce pavement is suitable. Preferred fibers are polypropylene homopolymers or copolymers, and most preferred are polypropylenes having from none up to about 10% of a olefin comonomer. Typically, such fibers are obtained from conventional linear polypropylene or copolymers thereof with ethylene. When polypropylene is used, it may have a viscosity average molecular weight of about 140,000 to 280,000, or even higher.

The fibers may be mono- or multi-component (e.g., bicomponent) fibers and/or multiconstituent (e.g., biconstituent) fibers. Bicomponent fibers include those having a particular component disposed along the length of the fiber; exemplary geometries include core/sheath fibers (e.g., polypropylene core and polyethylene sheath), side-by-side fibers, islands-in-the sea, and like arrangements. Multiconstituent fibers are those in which a component is a compatible mixture or blend of two or more fiber-forming compositions.

One preferred composition is an alloy comprising a polyolefin and a polyarylate, wherein the polyarylate is present in an amount sufficient to increase the softening point of the fiber. The "softening point" is essentially the crystalline melting temperature of the material. Preferably the alloy comprises polyethylene, polypropylene, or a copolymer thereof as a component of the polyolefin portion of the alloy. The polyarylate portion of the alloy preferably comprises an aromatic moiety in its backbone to provide improved heat stability. Suitable polyarylates include polyesters such as PET, polyphenylsulfones, and the like. The polyolefin and the polyarylate are preferably compatible with each other (and any other polymeric or additive compositions present) in the alloy at all temperatures required for their fabrication into fibers and their use in the production of a geoway. The preferred alloy comprises 98–50 wt. % polypropylene (hereinafter "PP") and 2–45 wt. % poly(ethylene terephthalate) ("PET"), more preferably 87–73% PP and 13–27% PET, and most preferably 82–78% PP and 18–22% PET. Other preferred fiber compositions include as additional constituents of the polyolefin portion a styrene- and/or maleic acid-modified polyolefin; the addition of these types of polymers to a PP/PET alloy improves the compatibility between the PP and the PET; similar compatibility-enhancing polymers can be used with other polyolefin/polyarylate combinations. These modified polymers are made by known techniques wherein styrene, maleic acid, maleic anhydride, or a similar material is grafted onto the backbone of the polymer using a free radical catalyst to maintain the homogeneity of the alloy, the polyolefin(s) and the polyarylate(s) should have a degree of compatibility with each other. Likewise, alloys useful in this invention are melt-spinnable. Other useful fibers are described in U.S. patent application Ser. No. 08/285,559, filed this same date (Exp. Mail Lbl. No. EF371478684US) (the disclosure of which is incorporated herein by reference).

After spinning, the fiber is treated with an antistatic finish to render it suitable when in staple form for airveying. The antistatic finish is applied to the fibers in an amount effective to prevent clumping during airveying. For polyolefin fibers, a blower static charge reading of not more than about 1.0 kV, preferably not more than about 0.2 kV, and most preferably about 0.0 kV, is generally indicative of a sufficiently diminished static charge that clumping will not occur. Blower static charge can be measured using conventional devices (e.g., a model FM-300 Electrostatic Fieldmeter available from the Simco Co., Inc., Hatfield, Pa.; accuracy±10%). A simple test for determining "blower static charge" is to feed bundlettes of the staple fiber to a standard insulation blower, catch the airveyed staple fibers in a cardboard box, and measure the electrostatic charge in the stream of staple fibers being airveyed into the box.

Polyolefin fibers are typically hydrophobic, and so antistatic finishes are typically applied to increase handlability. The presence of too much of an antistatic finish on oleophilic staple fibers for reinforcing pavement can decrease the oleophilicity of the fiber, thereby diminishing their reinforcing effect. While oleophilicity can be implied from hydrophilicity determined by known methods for measuring contact angle, it is preferred to define oleophilicity quantitatively with reference to an "Asphalt Adhesion Test", for which it the preferred value is at least about 35. As used herein, the Asphalt Adhesion Test measures the weight of asphalt (or other cement used for the pavement) that adheres to a given weight of fiber; thus, a value of 35 g. of asphalt per gram of fiber is preferred for conventional asphaltic hot-mix pavements. Using asphalt meeting state or AASHTO (American Association of State Highway Transportation Officials) specifications, the Asphalt Adhesion test is conducted by taking a tow or bundle having about 300 filaments of 4 dpf fiber and cutting the tow into a bundlette of staple fibers having a lengths of 4¼ inches. The bundlette weight is adjusted by adding to or from the bundlette staple fibers until the bundlette weight is 0.012 g.±0.002 g. The bundlette is clipped (e.g., using a lab clip or by taping to a paper clip) at a distance of 4 in. so that the individual staple fibers resemble the fibers of a paint brush. Asphalt is heated in a covered container to 280° F., the cover is removed, and the fibers (with the clip) are pushed into the hot asphalt; the fibers tend to float on the liquid asphalt and so must be forcibly immersed and agitated gently to make sure the asphalt coats the fibers. After five (5) seconds of immersion, the sample is removed and, while support the clip so the fibers hang vertically, the fibers are allowed to cool to room temperature. The fibers are cut from the clip at the 4 in. length and weighed. The difference between starting weight and final coated weight is recorded. The test is repeated using four additional fiber samples and is precise when the standard deviation is not more than 5% of the average weight of the asphalt cement on the samples.

Suitable antistatic fiber finishes are described in the Schmalz, Harrington, and Johnson and Theyson patents and applications described in the Background section. As such, the antistatic finish is selected from among: (i) a neutralized $C_3$–$C_{12}$ alkyl or alkenyl phosphate alkali metal or alkali earth metal salt and a solubilizer; (ii) a neutralized phosphoric ester salt having the general formula $(MO)_x$—$(PO)$—$(O(R_1)_nR)_y$ wherein generally M is an alkali or alkali earth metal, $R_1$ is a short chain alkylene oxide, R is a long chain alkyl or alkenyl group, and x and y are natural numbers having the sum of 3; (iii) an amine or alkali metal neutralized phosphoric acid alkyl ester; (iv) an amine or alkali metal neutralized phosphoric acid ester of the general formula $(MO)_x$—$(PO)$—$(OR)_y$ wherein M is an amine or alkali metal, R is an alkyl group, and x and y are natural numbers having the sum of 3; and mixtures thereof. The antistatic finish thus can be neutralized with an alkali metal, an alkali earth metal, an amine, or a mixture thereof. One preferred antistatic finish is an amine (morpholine) neutralized phosphoric acid ester (available as LUROL® AS-Y from George A. Goulston, Co., Monroe, N.C.). Another suitable antistatic finish is Zelec NE (available from DuPont de Nemours & Co., Wilmington, Del.); however, this finish is suitable but less preferable because of odors that evolve during its use. The antistatic finish may be applied one or more times at various points in the process of making staple fibers, and is preferably applied as a spin finish.

Lubricant finishes are also desirable for making the fibers of this invention. Preferred lubricants are esters of polyoxyalkylene glycols and mixed dibasic acids, such as described in U.S. Pat. Nos. 3,925,589 and 3,959,187 (the disclosures of which are incorporated herein by reference), a preferred one of which is the oleophilic polyoxyalkylene mixed dibasic acid ester composition EMERLUBE 7485B (available from Henkel Corp., Ambler, Pa.). Many finishes sold commercially provide some degree of antistatic properties. Far example, the EMERLUBE 7485B composition includes an amine (morpholine) neutralized phosphoric acid ester. Other suitable lubricant compositions are described in the Schmalz, Harrington, and Johnson and Theyson patents and applications mentioned in the Background section.

After spinning and having at least an antistatic finish applied thereto, the fibers are processed conventionally (preferably not crimped), including being made into tows and chopped into staple fibers; the fibers in a tow tend to adhere to each other, so when the tow is chopped the staple fibers remain as grouped in the tow as a small bundle (a "bundlette", since the length of reinforcing fibers is generally about 10 mm, or about 25 mm at most). The bundlettes eventually end up in a location where they are to be airveyed and admixed with a pavement for application to a suitable surface.

EXAMPLE 1

An aqueous spin finish made from a mixture of 90% EMERLUBE 7485B and 10% of LUROL® AS-Y was provided and applied as a spin finish to a polypropylene fiber. The treated fibers had between 0.73% (fiber weight basis) and 0.79% of the finish on their surface. The polypropylene fiber was then processed into staple fibers having a denier of 4.27 dpf, a tenacity of 4.23 gpd, and an elongation of 123%.

Using a standard insulation blower (e.g., Snapper brand), blower static charge (as described above) was measured at about 0.0 kV.

COMPARATIVE EXAMPLE 1

Polypropylene fibers as described in Example 1 were provided with a spin finish of only EMERLUBE 7485B at a level of 0.9%. These fibers gave an average blower static charge of at least 3 kV.

EXAMPLE 2

The same polypropylene staple fibers as described in Example 1 were provided with 0.6% of LUROL PP-912 antistatic spin finish (G. A. Goulston Co.). These fibers registered a blower static charge of about 0.0 kV; however, these staple fibers may be undesirable for reinforcing pavements due to the hydrophilic nature of the finish.

EXAMPLE 3

The same polypropylene staple fibers as described in Example 1 were provided with a finish containing 90% EMERLUBE 7485B and 10% Zelec NE. These fibers had a blower static charge of about 0.1 kV.

The present invention has been described with reference to the foregoing embodiments and examples without being limited by the particular content thereof, and various additions, substitutions, deletions, and other modifications thereof are intended to be within the scope and spirit of the invention as defined by the following claims.

What is claimed is:

1. A polyolefin staple fiber suitable for reinforcing pavement having on its surface an antistatic finish in an amount effective to prevent clumping when a multiplicity of the staple fibers are airveyed, and wherein the fiber with the finish on its surface is oleophilic.

2. The fiber of claim 1, wherein the amount of antistatic finish is effective to provide a blower static charge of not more than about 1.0 kV.

3. The fiber of claim 2, wherein the amount of antistatic finish is effective to provide a blower static charge of not more than about 0.2 kV.

4. The fiber of claim 1, wherein the fiber comprises polyolefin homopolymers having units derived from $C_2$–$C_6$ olefinic monomers.

5. The fiber of claim 4, wherein the fiber comprises a copolymer of a $C_2$–$C_4$ olefinic monomer with a different $C_2$–$C_6$ olefinic monomer.

6. The fiber of claim 5, wherein the $C_2$–$C_6$ monomer is selected from the group consisting of ethylene, propylene, 1-butene, 2-butene, 1,3-butadiene, 4-methylpentene-1, and mixtures thereof.

7. The fiber of claim 1, wherein the fiber comprises an alloy of a polyolefin and a polyarylate.

8. The fiber of claim 7, wherein the fiber comprises an alloy of polypropylene and poly(ethylene terephthalate).

9. The fiber of claim 1, wherein the antistatic finish comprises a neutralized phosphoric acid ester.

10. The fiber of claim 9, wherein the neutralized phosphoric acid ester is selected from the group consisting of: (i) a neutralized $C_3$–$C_{12}$ alkyl or alkenyl phosphate alkali metal or alkali earth metal salt and a solubilizer; (ii) a neutralized phosphoric ester salt having the general formula $(MO)_x$—$(PO)$—$(O(R_1)_nR)_y$ wherein generally M is an alkali or alkali earth metal, $R_1$ is a short chain alkylene oxide, R is a long chain alkyl or alkenyl group, and x and y are natural numbers having the sum of 3; (iii) an amine or alkali metal neutralized phosphoric acid alkyl ester; (iv) an amine or alkali metal neutralized phosphoric acid ester of the general formula $(MO)_x$—$(PO)$—$(OR)_y$ wherein M is an amine or alkali metal, R is an alkyl group, and x and y are natural numbers having the sum of 3; and mixtures thereof.

11. The fiber of claim 10, wherein the antistatic finish is an amine neutralized phosphoric acid ester.

* * * * *